United States Patent [19]

Knights et al.

[11] Patent Number: 5,766,330

[45] Date of Patent: Jun. 16, 1998

[54] METHOD OF SUSPENDING INSOLUBLE CALCIUM IN PROTEIN COMPOSITION

[76] Inventors: Ralph J. Knights, 2327 Hidden Valley Dr., Santa Rosa, Calif. 95404; Lynne M Kjelsberg, 9425 Lazy Creek Dr., Windsor, Calif. 95492

[21] Appl. No.: 774,861

[22] Filed: Dec. 24, 1996

[51] Int. Cl.$^6$ ............................................. C08L 89/00
[52] U.S. Cl. ........................... 106/124.2; 106/151.1; 106/156.23; 106/157.2
[58] Field of Search .................... 106/124.2, 151.1, 106/156.23, 157.2

[56] References Cited

U.S. PATENT DOCUMENTS

| | | | |
|---|---|---|---|
| 2,181,003 | 11/1939 | Salzberg | 106/156.23 |
| 2,330,428 | 9/1943 | Hughes et al. | 106/157.2 |
| 4,126,607 | 11/1978 | Eastin | 106/151.1 |

*Primary Examiner*—David Brunsman
*Attorney, Agent, or Firm*—Knobbe, Martens, Olson & Bear, LLP

[57] ABSTRACT

A method for forming a dry powder of insoluble calcium salts and protein from an aqueous composition. The process results in a dry powder that can be reconstituted in water with an unexpected extended and beneficial suspension of the insoluble calcium salts in the aqueous composition. The process includes blending the insoluble calcium salt with an agitated aqueous mixture of a protein source, either soluble or insoluble, followed by drying the resulting mixture. The resulting dry powder can be reconstituted in water or other media to produce a suspension of the insoluble calcium salts with the beneficial feature that the calcium salts do not sediment or separate.

20 Claims, No Drawings

METHOD OF SUSPENDING INSOLUBLE CALCIUM IN PROTEIN COMPOSITION

BACKGROUND OF THE INVENTION

This invention relates generally to the treatment of insoluble calcium salts in protein compositions to produce a dry powder that can be reconstituted in water or other media to produce a suspension of the insoluble calcium salts with the beneficial feature that the treated calcium salts do not form a sediment or otherwise separate from the prepared suspensions.

a. Calcium as Food Supplements

Calcium is a beneficial component of animal nutrition. In human nutrition, calcium should be a part of the diet from birth to death. From birth to young adulthood, the calcium consumed as part of the diet is utilized for bone growth, bone density, tooth enamel, and a number of important cellular activities. For the teenage years through mature adulthood, calcium is used to maintain bone density and avoid osteoporosis. Maintenance of a routine, daily intake of bioavailable calcium also contributes to low blood pressure and reducing the incidence of kidney stones.

All of the published nutritional guidelines recommend daily consumption of foods containing calcium. Recommendations vary according to the age, size, and sex of an individual with the average intake for an adult recommended to be approximately 1,000 mg of calcium per day, see U.S. Code of Federal Regulations 101.9(c)(8)(iv). A recent review sponsored by the National Institute of Health stated, "The preferred source of calcium is through calcium-rich foods such as dairy products. Calcium-fortified foods and calcium supplements are other means by which optimal calcium intake can be reached in those who cannot meet this need by ingesting conventional foods." See *Nutrition* (1995) pages 409–417.

Calcium supplements are, in general, calcium salts that are either soluble or insoluble in water. The soluble calcium salts (for instance calcium chloride, calcium lactate, calcium malate, and, to some extent, calcium citrate) form relatively clear solutions when dissolved in water and have a high calcium activity. Because of the high calcium reactivity of the soluble salts, they may cause undesirable effects in processed foods, such as aggregation, coagulation, and flocculation of protein components. The insoluble calcium salts, calcium carbonate and calcium phosphate, have low calcium reactivities and do not have undesirable reactions with other processed food components. However, insoluble calcium salts have a chalky or gritty texture and they separate out of food formulations instead of remaining homogeneously dispersed in the food.

There are three general ways that food processors and food ingredient manufacturers treat insoluble calcium salts in order to use them as calcium supplements in foods and in order to use them in non-food applications such as pigments and paper coating. The three general ways are to reduce the particle size, to increase the viscosity or gel strength of the supplemented product, and to use very specialized forms of these insoluble calcium salts. These techniques are described in more detail in the following paragraphs.

One method utilized in the preparation of insoluble calcium salts used in foods is to reduce the size of the particles. U.S. Pat. No. 5,205,493 describes a method for preparing calcium carbonate by a series of grinding steps and particle selection processes in order to produce a uniform, small particle size. J. Bleeck and A. E. Hodel (*Chemical Processing*, May 1967, page 140) describe a method for grinding and then using air classification techniques to separate and select small particles of the insoluble salt. Although small particle sizes can be obtained, it is difficult to obtain high yields of particles that are less than 1 micron. However, particles that are 1 micron in diameter still settle out of liquids fairly rapidly because of the lack of interaction with other components and because of a relatively high particle density.

The second way of suspending insoluble calcium salts in food preparations, especially liquids, is to use gums and thickeners in order to increase the viscosity of the composition. This is exemplified by U.S. Pat. No. 4,701,329 which describes adding a finely divided calcium compound into milk containing carrageenan and guar gum. However, according to Stokes Law, the finely divided calcium salts will still settle out, but at a slower rate than in less viscous preparations.

The third way of keeping insoluble calcium salts from settling or packing at the bottom of liquid suspensions is through special preparations involving physical barriers and chemical reactions. Hirotsuka et al (*J. Food Science*, 1111–1112, 1127; 1984) described the preparation of calcium-containing lipozomes made using soluble calcium salts coated with a membrane of soy lecithin. This invention would release protein reactive calcium ions if heated. U.S. Pat. No. 5,317,053 described a method for maintaining a stable, high solids suspension of calcium carbonate using a copolymer of acrylic acid and a sulfonated vinyl monomer. These latter compositions are not allowed in foods. Rosenberg at el (*Journal of Dispersion Sciences and Technology*, 1989, 241–250) described the use of an anionic polysaccharide as a dispersing agent for finely divided calcium carbonate. Highly concentrated calcium carbonate suspensions can be maintained at a workable consistency using this invention, but, in foods, the calcium supplements are not concentrated which limits the utility of the invention for food compositions.

Lin and Cho (U.S. Pat. No. 4,642,238) described a process for keeping calcium phosphate from settling out of water suspensions by first making a hydrated gel (no particles) of calcium phosphate, then adding soy protein to the hydrated gel, and finally drying the calcium phosphate supplemented soy protein. The dried product made via this process can then be redispersed in a liquid food with improved suspension of the calcium supplement. The process described by Lin and Cho requires the careful preparation of a calcium phosphate gel which was washed and centrifuged several times to remove excess reactants. Because of the high water content of the gel (94%), the mixture of soy protein and hydrated gel was also of high moisture content, so the subsequent drying of that mixture could not be performed under ideal conditions of a high solids content. Soy protein containing the calcium phosphate had a calcium content ranging from 1.5% to 5.0% by weight of the protein. It would be desirable to utilize readily available commercial raw materials, to not have to prepare and wash the specialized calcium phosphate gel, and to extend the calcium content or the calcium to protein ratio to much higher levels suitable for use as a supplement in other foods.

There are three significant differences between the teaching of Lin and Cho (4,642,238) and the invention described herein. First, U.S. Pat. No. 4,642,238 reports that a hydrated gel of calcium phosphate is required and a dried mineral supplement did not provide the beneficial suspension properties. We have found that dried mineral supplements, especially calcium carbonate and calcium phosphate, can be used in accordance with the process of our invention. Second, U.S. Pat. No. 4,642,238 reports that an improved suspension is achieved both before and after drying the composition. We found that the desired suspension benefits were obtained only after drying the composition. Third, U.S. Pat. No. 4,642,238 reports a calcium to protein ratio of about 0.05 while we find that calcium to protein ratios as high as 1.36 are possible.

b. Proteins Used in Foods

A variety of proteins are used in formulating and producing processed foods. The proteins are used for two main reasons. First, they are used to provide desirable functional or sensory characteristics, and these include: emulsion stability, texture, appearance, mouthfeel, flavor, and physical stability during production, storage, and preparation for consumption. Second, proteins may be included in processed food formulations for nutritional purposes. That is, approximately 50 grams of high quality dietary protein should be consumed daily as part of a balanced diet.

Foods that are high in protein are used by ingredient processors to prepare protein concentrates and protein isolates. These protein-containing ingredients may be from 25 to 95% protein, on a dry basis, and they may, for instance, be in the form of: milk and dried milk, milk protein concentrates and dried milk concentrates, milk protein fractions such as casein and whey, soy protein concentrates and soy isolates, egg albumin, meat and plasma extracts or concentrates, nut flour and protein concentrates derived therefrom, fish and fish protein concentrates, and a number of others. Aside from milk, most of these protein sources are not good calcium sources.

Some proteins can be isolated from foods by precipitating the proteins with an acid treatment. The preparation of soy protein isolates and the preparation of milk proteins, especially casein, typify this kind of isolation technique. The proteins are precipitated at or near the isoelectric point of the protein, usually around pH 4.5. These acid precipitates are washed to remove oils, carbohydrates, and other soluble materials and then they are either dried or they can be neutralized with a variety of food grade alkali agents in order to produce highly functional food ingredients. If the alkali used is calcium hydroxide, $Ca(OH)_2$, then a calcium caseinate or a calcium soy isolate, for example, can be produced. These neutralized calcium-containing proteins are also good sources of bioavailable calcium, but there is a limit to the amount of calcium that can be provided per gram of protein, with this limit dictated by the acid treatment and the buffering capacity of the acidic protein produced as a precipitate.

It would be highly desirable that ingredient producers be able to supply proteins which retain their well understood characteristics, but which also contain a high level of calcium suitable for providing supplemental calcium in the form of a stable and homogeneous suspension.

c. Calcium Level in Milk Proteins

The calcium of milk is provided by a natural colloidal suspension of calcium phosphate in a complex structure involving aggregates of casein or caseinates. The calcium to protein ratio in milk is approximately 35 mg of calcium per gram of protein, or 3.5 grams of calcium per 100 grams of protein. This colloidal suspension is solubilized and removed during the preparation of precipitated acid casein. When acid casein is re-neutralized with lime, $Ca(OH)_2$, the maximum level of calcium that can be achieved is approximately 1.4 to 1.5 grams of calcium per 100 grams of protein.

It would be highly desirable to prepare caseinates and other protein isolates with higher levels of calcium in order to match or exceed the 0.035 calcium to protein ratio found in milk.

Calcium caseinates are less soluble than caseinates made by neutralizing acid casein with a monovalent base such as sodium hydroxide, NaOH, or potassium hydroxide, KOH. Because of the limited solubility of calcium caseinates, they do not have the same functional attributes of soluble sodium caseinate. That is, calcium caseinates do not have the body, mouthfeel, viscosity, adhesive characteristic, or emulsion and foam stabilization properties of the more soluble sodium caseinate. It would be highly desirable to prepare calcium caseinates that have a high level of calcium and that also have the functional attributes of the more soluble sodium case mate.

Milk protein coprecipitate is an insoluble form of both the casein and the whey proteins from milk. The coprecipitate derives its name from the fact that the usually soluble whey proteins are collected as a precipitate along with casein under conditions in which the coprecipitate is made. There are two ways of making the coprecipitate. In the first case, skim milk is heated to >90°C. and then enough calcium chloride, $CaCl_2$, is added to the hot milk to cause both the whey proteins and the casein to precipitate together; the precipitate is then washed and dried as a co-precipitate. This technology and processing has been reviewed in two articles (Muller, L. L., Hayes, J. F., and Snow, N. Studies on coprecipitates of milk proteins. Part I. Manufacture with varying calcium contents, *Aust. J Dairy Technol.*, 22, 12, 1967, and Buchanan, R. A., Snow, N. S. and Hayes, J. F., The manufacture of "calcium coprecipitate" *Aust. J Dairy Technol.*, 20, 139, 1965).

The second way to prepare milk protein coprecipitates is described U.S. Pat. No. 4,376,072 (Mar. 8, 1983) which illustrates methods for heat treatment and pH adjustments necessary to precipitate the whey proteins at the isoelectric point of casein, pH 4.5. This coprecipitate curd is washed, dried, and can be neutralized with any type of food grade alkaline agent. The second method produces a product called Total Milk Protein, TMP, available from New Zealand Milk Products.

For milk protein coprecipitates prepared with $CaCl_2$, the calcium to protein ratio can be as high as 0.05, and for $Ca(OH)_2$ neutralized TMP, the calcium to protein ratio maximum is around 0.015, or lower than that of milk. It would be desirable to be able to produce milk protein coprecipitates and functional variations thereof with calcium to protein ratios exceeding that of milk and exceeding those allowed by current technology.

Skim milk can be processed using ultrafiltration membranes to remove water and water soluble components such as lactose and the soluble minerals. Ultrafiltration processing produces so called Milk Protein Concentrates which retain most of the native casein, calcium, and phosphate. In the preparation of food products, milk protein concentrates are used where nonfat milk is used and where the lactose of nonfat milk is either not desired or not required. Ultrafiltration does, however, reduce the calcium to protein ratio. Although milk protein concentrates with high levels of protein and very low levels of lactose can be produced by extensive ultrafiltration processing, these milk protein concentrates have a low calcium to protein ratio compared to milk.

Table I below lists nonfat dry milk and some of the commercially available milk proteins along with their calcium contents and the calcium to protein ratio.

TABLE I

| Ingredient | Calcium % as is | Protein % as is | Calcium/Protein |
|---|---|---|---|
| Nonfat Dry Milk | 0.123 | 3.5 | 0.035 |
| Milk Protein Concentrate | 1.8 | 56 | 0.032 |
| Milk Protein Concentrate | 2.2 | 81 | 0.027 |
| Calcium Caseinate | 1.4 | 90 | 0.015 |
| Milk Protein Co-precipitate | 3.0 | 86.4 | 0.035 |
| Soy Isolate | Low | 90 | <0.01 |
| Calcium Carbonate | 40 | 0 | na |
| Tribasic Calcium Phosphate | 39 | 0 | na |

It would be very desirable to produce milk protein concentrates with high protein contents with a low level of lactose and with a higher level of calcium than current technology allows so that these ingredients can be used to provide high levels of calcium as well as high quality protein.

We have found a process for making high calcium ingredients that have all of the above mentioned desired attributes. The products of this invention contain higher levels of calcium than heretofore obtained by any process. The calcium-containing proteins of this invention are unlike calcium-containing proteins of disclosed art in that the new products have solubility, viscosity, and emulsion stability characteristics similar to sodium forms of proteins, yet they have the opacity characteristic of calcium forms of the protein. Readily available food ingredients and standard processing equipment are used. The high calcium proteins are easily dispersed in food compositions and they remain homogeneously dispersed throughout processing. The high calcium ingredients and formulations using them are not adversely affected by heat or retort processing, while milk proteins, milk protein concentrates, milk protein coprecipitates, and soy isolates can be used in the preparation of calcium supplements that do not sediment in processed foods, those skilled in the art will recognize that other proteins and protein combinations could also be used. Likewise, calcium carbonate and calcium phosphate have been used, and those skilled in the art will recognize that combinations and other anionic and cationic salts can also be used beneficially.

SUMMARY OF THE INVENTION

There has been developed a calcium and protein composition suitable for use in calcium supplemented foods of any viscosity and suitable for use in non-food applications as well. The composition uses inexpensive ingredients that are readily available. The processing employs equipment currently used for ingredient manufacturing. It has been found that by drying a suspension of an insoluble calcium salt in the presence of a protein, the insoluble salt is converted, without dissolving and without apparent chemical conversion, to a form especially useful as a calcium supplement in processed foods where calcium salts, in general, sediment or create instability. In these foods, the modified calcium salt of this invention remains dispersed and suspended for a much longer time than the unmodified calcium salt. The protein and calcium composition also has among its desirable attributes; that it does not precipitate proteins, it does not form a sediment layer, it does not have a chalky or powdery mouthfeel, it provides opacity or a white appearance, and it is stable to heat treatments.

The new calcium ingredients can be used to supplement liquids, semi-solids, and solid foods, and the technique can be used to keep pigments of insoluble calcium salts suspended for consistent, even coatings on finished goods.

The two components of this new composition are a protein and a calcium-containing salt. These are mixed together and the mixture is dried to produce a calcium-containing protein ingredient with the enhanced calcium suspension properties.

The protein component can originate from numerous sources including milk and soy proteins as well as soluble or partially soluble proteins from other foods (grains, meats, fish, legumes, plasma, nuts, eggs, and microbial sources) to produce the desired effect. The form of the protein can be in monomers, polymers, aggregates, or hydrolysates.

Milk, skim milk, egg white, extracts from grains, etc. may be used in their most convenient, economic form. Dried protein preparations are suspended or dissolved in water or other liquid media. Insoluble proteins such as acid casein or soy are rendered at least partially soluble by the addition of alkali. Na, K, Ca, Mg, oxides or hydroxides as well as ammonia, alkaline phosphates, citrates, or carbonates are some of the alkaline agents that can be used to adjust the pH above the isoelectric pH. Heat treatment, chelation, and chemical or enzymatic modifications may also be applied to produce a suitable protein component. Reconstitution of a dried form of the protein ingredient is not required.

Casein is the protein that is precipitated from milk by adjusting the pH of the milk to the isoelectric point of the milk protein. The precipitated protein is typically washed to remove fat, carbohydrate, and soluble minerals and protein. The precipitated casein can be dried and stored for later use or the casein can be converted from the hydrated, acid curd to another form by treatment with alkali, heat, salts, enzymes, or other processing aids.

Precipitated or acid casein is converted to a caseinate, a more soluble, functional form, by treatment with alkaline agents. Typical alkalis include Na, K, Ca, Mg, or other oxides or hydroxides. Ammonia or alkaline salts of phosphate, carbonate, or citrate may also be used. The alkaline agents can be used either separately or in combination in accordance with methods practiced by those skilled in the art.

Generally, the alkali is added to a suspension of insoluble acid casein in water in an amount sufficient to raise the pH from the isoelectric point, pH 4.5, to between pH 6 and 8, and more generally around pH 7. When calcium hydroxide is used as the sole alkaline agent, the amount of calcium that needs to be added is dictated by the desired pH change and the neutralizing properties of this protein. Typically, calcium caseinates can be made through standard processing techniques to contain a maximum of approximately 1.4 grams of calcium per 100 grams of protein.

An insoluble or partially soluble calcium salt is added to the above suspension or solution of protein. Calcium carbonate, calcium phosphate (in any of its several forms), and calcium citrate are three such salts, but this is not meant to be an all inclusive list. The insoluble salts should have a particle diameter in the range of 0.1 to 100 microns and preferably less than about 20 microns. Smaller particle sizes are preferred, but calcium carbonate and calcium phosphate with average particle sizes between 1 and 15 microns are suitable. The insoluble calcium salt can be added directly to the protein preparation in an agitated vessel, the salt can be suspended in water or other media as a slurry which is added to the protein preparation, or the salt can be added to the protein preparation through an in-line mixer or mill in either a continuous or a batch operation.

Little reaction appears to take place between the insoluble calcium salt and the protein, and the insoluble calcium salt may settle rapidly out of the protein and salt mixture if the mixture is not continuously agitated. Other components could be added to the mixture of protein and calcium salt (for instance carbohydrates, gums, fats, emulsifiers, salts, and so forth), but these are not required for obtaining the desired effect of producing a stable suspension of the insoluble calcium salt.

The mixture is then dried. For food use, the mixture would be pasteurized by heat treatment or by other means to reduce the microbial content prior to drying. Spray dryers of various configurations are typically used for this operation, but attrition dryers, ring dryers, belt dryers, or other pieces of equipment known by those skilled in the art could also be used.

The dried composition can now be used in the same fashion that the individual components would have been used with the beneficial effect that reconstitution and use of this dried composition provides a calcium supplement that does not sediment or separate from high, medium, or low viscosity products. The advantageous suspension properties appear to be due to interactions between the insoluble calcium salt and the protein during the process of drying. During that process, the removal of water or liquid media may provide intimate contact between the components of the mixture in a way that may not be achieved by other means.

In order to more clearly disclose the nature of the present invention, specific examples of the practice of the invention are hereinafter given. It should be understood, however, that this is done by way of example and is intended neither to delineate the scope of the invention nor limit the ambit of the appended claims.

DESCRIPTION OF THE PREFERRED EMBODIMENTS

Example 1

Forty pounds of acid casein (ALACID 741, New Zealand Milk Products) was added to 180 pounds of water at 110° F. The pH was adjusted to approximately pH 7 by adding 200 grams of NaOH pellets plus 218 grams of lime. The mixture was stirred at 110 °F. or, alternatively, pumped through a mill for a period of 30 minutes. Fourteen hundred forty grams of calcium carbonate, $CaCO_3$, with an average particle size of 1 micron was added directly to the mix. Note: the $CaCO_3$ could also be added by dispersing the salt in 6,000 grams of water, or added by injecting the water dispersion of the salt through a high shear mill. The mixture was then pasteurized (heated to 162° F. and held for 30 minutes) and spray dried. The dried, high calcium caseinate product had a protein content of 86%, an ash content of 8%, and a calcium content of 3.8%. The calcium to protein ratio was 0.043.

The improvement to sediment separation of the insoluble calcium salt was tested in two ways. Five (5) grams of the dried high calcium caseinate product of Example 1 was suspended in 100 grams of water. Fifteen (15) milliliters was placed in a graduated tube and the suspension allowed to sit quiescently for up to 12 hours. During that time, the volume of white sediment was measured and noted as shown in the table below. As a control, an equivalent composition of unprocessed sodium caseinate mixed with unprocessed 1 micron $CaCO_3$ was also prepared and observed. The two 15 milliliter suspensions contained 0.68 grams of protein and 0.07 grams of $CaCO_3$.

TABLE II

| Test Ingredients | Volume of Sediment (ml) | | |
|---|---|---|---|
| | 10 minutes | 2 hours | 12 hours |
| Unprocessed Caseinate Plus $CaCO_3$ | 0.02 | 0.03 | 0.07 |
| Processed High Calcium Caseinate | 0.00 | <0.01 | 0.04 |

Note that the maximum amount of sediment is around 0.07 milliliters, and this was observed for the unprocessed caseinate plus $CaCO_3$. For the high calcium caseinate, the accumulation of sediment was much slower.

The high calcium case mate was also compared to a mix of standard caseinate and unprocessed calcium carbonate in a liquid nutritional formulation that contained a balanced amount of protein, carbohydrate, fat, and minerals. The ingredients used to prepare the control and the test formulations are given below. The test formulation was made with high calcium caseinate replacing both the standard caseinate and the calcium carbonate. In both the control formulation and the test formulation, calcium carbonate with a average particle size of 1 micron was used.

TABLE III

| Ingredients | Control Grams | Test Grams |
|---|---|---|
| Water | 1250 | 1250 |
| Maltodextrin (DE 10) | 150 | 150 |
| Sucrose | 65 | 65 |
| Safflower Oil | 50 | 50 |
| Caseinate | 60 | — |
| Calcium Carbonate | 5.5 | — |
| High Calcium Caseinate | — | 65.5 |
| Lecithin | 5.0 | 5.0 |
| Magnesium Chloride | 2.6 | 2.6 |
| Potassium Chloride | 2.5 | 2.5 |
| Potassium Citrate | 1.7 | 1.7 |
| Sodium Phosphate | 1.1 | 1.1 |
| Potassium Phosphate | 0.6 | 0.6 |
| Sodium Citrate | 0.6 | 1.8 |
| Carrageenan | 0.5 | 0.5 |
| Zinc Sulfate | 0.08 | 0.08 |
| Ferrous Sulfate | 0.07 | 0.07 |

The control and the test formulations were prepared in the same fashion, processed in the same equipment, and tested in the same manner. The liquid formulations were homogenized at 2000 psi, packaged in 10 ounce glass jars, and sterilized in a rotary retort. Maximum temperature was 250° F. for 5 minutes. After sterilization, product characteristics were noted during six months of storage at room temperature.

The observations during storage showed that the formulation made with the high calcium caseinate had a better appearance (less grainy) immediately after sterilization, and this formulation also had virtually no sediment after long term quiescent storage.

TABLE IV

| Attributes | Formulation Properties | |
|---|---|---|
| | Standard Caseinate | High Calcium Caseinate |
| | Time = 1 week | |
| Sediment | packed white sediment | none |
| Appearance | fine grain | smooth |

TABLE IV-continued

Formulation Properties

| Attributes | Standard Caseinate | High Calcium Caseinate |
|---|---|---|
| | Time = 3 months | |
| Sediment Appearance | packed white sediment many large particles | none a few small specks |
| | Time = 6 months | |
| Sediment Appearance | packed white sediment large particles, curds | none a few small specks |

Example 2

High calcium caseinate was prepared as described above (Example 1) using 1 micron particle sized calcium carbonate. To ten (10) pounds of acid casein, neutralized in the same way as in Example 1, was added twenty-seven (27) pounds of 1 micron $CaCO_3$. The mixture was pasteurized and dried as in Example 1. The dried product had a protein content of 25%, an ash content of 43%, and a calcium content of 34%. The calcium to protein ratio was 1.36, or nearly 40 times that in milk.

The improvement in sediment separation of the insoluble calcium salt was tested by suspending five (5) grams of the processed high calcium caseinate in 100 milliliters of water and observing the sediment compared to that of a similar composition of unprocessed sodium caseinate plus $CaCO_3$. The two 15 milliliter suspensions contained 0.13 grams of caseinate and 0.62 grams of $CaCO_3$.

TABLE V

| | Volume of Sediment (ml) | | | |
|---|---|---|---|---|
| Test Ingredients | 2 minutes | 10 minutes | 2 hours | 12 hours |
| Unprocessed Caseinate Plus $CaCO_3$ | 0.02 | 0.1 | 1.0 | 1.8 |
| Example 2 High Calcium Caseinate | 0 | 0.015 | 0.05 | 0.28 |

Compared to the control of unprocessed caseinate and $CaCO_3$, the high calcium caseinate of Example 2 produced less sediment over a longer period of time. It was also unexpected that a small amount of protein could improve the suspension characteristics of a relatively large amount of insoluble $CaCO_3$. Because sediment was evident in the control mixture of unprocessed caseinate and calcium carbonate, the mere presence of caseinate was insufficient to produce the observed benefit.

Example 3

High calcium caseinates were prepared as described in Example 1, but using either 1 micron, Example 3A; or 5 micron, Example 3B; or 14 micron particle sized calcium carbonate, Example 3C. The particle sizes provided herein are the average particle diameters reported by the supplier, ECC America, Inc., a Division of ECC International. The spray dried products all had similar compositions: protein was 86%, ash was 8%, calcium was 3.8%, and the calcium to protein ratio was 0.043.

Improvement to sediment separation of the insoluble calcium salt was tested by suspending 0.75 grams of the dried product in 15 milliliters of water and observing and measuring the amount of sediment compared to a control suspension of unprocessed sodium caseinate mixed with the unprocessed calcium salt at the same concentrations.

TABLE VI

| | Volume of Sediment (ml) | | |
|---|---|---|---|
| Test Ingredients | 10 minutes | 2 hours | 12 hours |
| Unprocessed Caseinate Plus 1 micron $CaCO_3$ | 0.02 | 0.03 | 0.07 |
| Example 3A High Calcium Caseinate | 0.00 | <0.01 | 0.04 |
| Unprocessed Caseinate Plus 5 micron $CaCO_3$ | 0.02 | 0.05 | 0.07 |
| Example 3B Processed High Calcium Caseinate | 0.01 | 0.03 | 0.06 |
| Unprocessed Caseinate Plus 14 micron $CaCO_3$ | 0.04 | 0.07 | 0.08 |
| Example 3 Processed High Calcium Caseinate | 0.03 | 0.06 | 0.08 |

Two of the three ingredients (3A and 3C) were used in preparing liquid formulations that contained a balanced amount of protein, carbohydrate, fat, and minerals. The ingredient levels used in the formulations were similar to those shown in the table of ingredients in Example 1 except that the test products were made with Examples 3A and 3C high calcium caseinates. Observations were made during storage of these formulations for up to six months.

TABLE VII

Formulation Properties After Preparation and Storage

| | | High Calcium Caseinate | |
|---|---|---|---|
| Attributes | Standard Caseinate Plus 1 micron $CaCO_3$ | 3A (with 1 micron $CaCO_3$) | 3C (with 14 micron $CaCO_3$) |
| | After 1 week | | |
| Sediment | packed, white sediment | none | none |
| Appearance | fine grain | smooth | fine grain |
| | After 3 months | | |
| Sediment | packed, white sediment | none | none |
| Appearance | many large particles | very few small specks | large particles |
| | After 6 months | | |
| Sediment | packed, white sediment | none | few white specks |
| Appearance | large particles, curd | a few small specks | large particles, curd |

Unexpectedly, the formulations containing high calcium caseinates made with 1 micron (3A) and with 14 micron (3C) average particle size calcium carbonate did not exhibit any sediment even after six months of quiescent storage while the formulation containing unprocessed, 1 micron calcium carbonate rapidly accumulated an obvious white sediment that was difficult to resuspend. The general appearance of the liquid was also improved when the processed high calcium caseinates (Examples 3A and 3C) used in the formulations. They were less grainy immediately after sterilization, and remained homogeneous for a much longer time during storage than did the control product which was made using unprocessed caseinate and calcium carbonate.

Example 4

High calcium caseinate was prepared as described in Example 1, above, but with tricalcium phosphate (Fortitech, micronized to 15 microns) as the insoluble calcium salt. Calcium phosphate was chosen because it is a commonly used calcium supplement and because both calcium and phosphate are complimentary parts of a balanced diet. The dried, high calcium caseinate product had a protein content of 86%, an ash content of 8%, and a calcium content of 3.8%. The calcium to protein ratio was 0.043.

The sediment characteristics of the high calcium caseinate was compared to the sediment characteristics of sodium caseinate and unprocessed calcium phosphate and was compared to the high calcium case mate of Example 3C made with 14 micron calcium carbonate.

TABLE VIII

|  | Volume of Sediment (ml) | | |
|---|---|---|---|
|  | 10 minutes | 2 hours | 12 hours |
| Unprocessed Caseinate Plus 15 micron Ca Phosphate | 0.06 | 0.10 | 0.14 |
| Processed High Calcium Caseinate (Example 4) | 0.00 | 0.02 | 0.07 |
| Processed High Calcium Caseinate (Example 3C) | 0.03 | 0.06 | 0.03 |

The unprocessed 15 micron calcium phosphate settles rapidly out of a suspension containing standard, unprocessed sodium caseinate. When the 15 micron calcium phosphate was dried in the presence of caseinate and then reconstituted in water, the processed insoluble calcium salt remained in suspension longer than unprocessed calcium phosphate and longer than processed, insoluble calcium carbonate of approximately the same particle size.

Example 5

Twenty-five pounds of milk protein concentrate (ALAPRO 4560, New Zealand Milk Products), which is a powdered product with a protein content of 56%, was added to 280 pounds of water at 110° F. After 15 minutes and without alkali or acid addition, the pH of the product was approximately 6.7. To this was added 579 grams of $CaCO_3$ (1 micron particles) suspended in 3,000 grams of water. Alternatively, the calcium carbonate suspension can be added to the reconstituted milk protein concentrate by circulation through a colloid mill. The mix was pasteurized (heated to 162° F. and held for 30 minutes) and then spray dried. The dried, high calcium milk product had a protein content of 53%, an ash content of 9.9%, and a calcium content of 3.8%. The calcium to protein ratio is 0.072, or twice the ratio found in milk.

Improvement to sediment separation was tested by suspending 0.75 grams of the dried product in 15 milliliters of water and observing and measuring the amount of sediment compared to a control suspension of unprocessed milk protein concentrate mixed with unprocessed calcium carbonate at the same concentrations.

TABLE IX

|  | Volume of Sediment (ml) | | |
|---|---|---|---|
| Test Ingredient | 10 minutes | 2 hours | 12 hours |
| Unprocessed MPC Plus 1 micron $CaCO_3$ | 0.02 | 0.03 | 0.08 |
| Processed High Calcium MPC, Example 5 | 0.00 | 0.00 | <0.01 |

Unprocessed calcium carbonate rapidly produced a sediment in a water suspension of milk protein concentrate (MPC), while very little sediment was observed with the high calcium milk protein concentrate produced using this technology. It is further expected that skim milk and pasteurized whole milk will aid the sediment character in the same way as the milk protein concentrate.

Example 6

Forty pounds of dried, Total Milk Protein (TMP) powder (New Zealand Milk Products) was added to 180 pounds of water at 110° F. The pH was adjusted to approximately pH 7 by adding 200 grams of NaOH pellets plus 218 grams of lime. The mixture was stirred at 110° F. and pumped through a colloid mill for a period of 30 minutes. Fourteen hundred forty grams of calcium carbonate, $CaCO_3$, with an average particle size of 1 micron were dispersed in 6,000 grams of water and added to the TMP through the colloid mill. The mixture was pasteurized (heated to 160° F. and held for 30 minutes) and then spray dried. The composition of the product was similar to that of the high calcium caseinates in Examples 1, 2, and 3. The powder was 86% protein, 8% ash, and 3.8% calcium, and the calcium to protein ratio was 0.043, the same as the caseinate examples.

The sediment separation of the processed calcium carbonate was tested by suspending 0.75 grams of the dry powder of Example 6 in 15 milliliters of water and observing the amount of sediment.

TABLE X

|  | Volume of Sediment (ml) | | | |
|---|---|---|---|---|
| Test Ingredient | 10 minutes | 1 hour | 2 hours | 12 hours |
| Processed Total Milk Protein with $CaCO_3$ | 0.00 | <0.01 | <0.01 | 0.01 |

Essentially no sediment was observed for the reconstituted powder of Example 6, while the control mixtures of unprocessed $CaCO_3$ in Examples 1, 2, and 3 showed three to ten times as much sediment. Although the types of milk protein (casein plus whey) are similar for Milk Protein Concentrate (Example 5) and for this coprecipitate (TMP, Example 6), the interactions between the whey and casein are different for the two protein ingredients. It is not known if the presence of whey proteins, or if the presence of soluble protein aggregates, or if completely different rationales can be used to explain the highly beneficial effects that this invention provides when insoluble calcium salts are dried in the presence of a combination of casein and whey.

Example 7

Twenty-five pounds of soy protein isolate (Supro 1500, Protein Technologies, International) were dispersed into 280 pounds of water at 110° F. After 15 minutes of agitation, the pH was measured at 6.8, more or less, and 1,080 grams of $CaCO_3$ (1 micron particles from ECC) blended with 5,000 grams of water was added to the soy isolate through a colloid mill. The mix was stirred for 15 minutes, pasteurized (heated to 162° F. and held for 30 minutes), and spray dried. The composition of the product was 80% protein, 8% ash, and 3.7% calcium. The calcium to protein ratio was 0.046 which is higher than the calcium to protein ratio in milk (0.035) and close to that of the high calcium caseinates of Examples 1, 2, and 3.

Sediment separation of the calcium salt was measured by suspending 5 grams of the product of Example 7 in 100 milliliters of water and observing the sediment which collected when 15 milliliters of this preparation was allowed to sit quiescently for 12 hours.

TABLE XI

|  | Volume of Sediment (ml) | | | |
| --- | --- | --- | --- | --- |
|  | 10 minutes | 1 hour | 2 hours | 12 hours |
| Soy Isolate Processed With 1 Micron CaCO$_3$ | 0.00 | 0.0 | 0.0 | <0.01 |

None of the insoluble CaCO$_3$ settled out of the resuspended high calcium soy isolate.

The high calcium soy isolate was also formulated into a beverage like that described in Example 1. The formulation was packaged in 10 ounce glass jars and sterilized by the retort process described in Example 1. During six months of storage, no sediment was observed.

From these examples, it is clear that several types of food proteins can be supplemented with the two major types of insoluble calcium salts, and it should be obvious that proteins other than those from milk or soy ought to also be suitable for preparing calcium supplements with the desired suspension characteristics. Other protein sources that could be used by those familiar with the art include protein-containing ingredients, or protein concentrates, or protein extracts either with or without fat, carbohydrate and other minerals. The beneficial suspension characteristics of the calcium supplemented Milk Protein Concentrates (Examples 5 and 6) indicate that the same technique could be used to prepare calcium supplemented powdered milk, either with or without fat, which could then be reconstituted or used in other processed foods. This may very well be one of the primary beneficial uses of this technology and invention.

The high calcium proteins made via this invention retain desirable functional attributes while also providing a high level of calcium. The high calcium caseinates of Examples 1 through 3, for instance, are actually sodium caseinates with sodium caseinate solubility, viscosity, and emulsion stabilizing characteristics, but they also form opaque dispersions like calcium caseinate and they contain more calcium than a typical calcium caseinate made by conventional process technology.

The product of Example 2 shows that insoluble calcium salts can be modified to greatly improve their suspension characteristics by drying these salts in the presence of just a small amount of protein. The product of Example 2 could be used not only as an ingredient for making processed foods, but also as a dispersible calcium supplement for addition to prepared foods, for consumption as a compressed tablet, for supplementing confections or gums, for whitening coffee or tea, and as an anti-caking ingredient dusted onto shredded cheese. This high calcium, low protein product may also be useful in the paper coating, paper filling, and pigment industries where a readily dispersible, small particle sized insoluble calcium salt that does not rapidly settle out of suspension and that contains an adhesive type of protein (caseinate or soy isolate) would provide unique benefits to processing or product quality in those particular industries.

Numerous food products would benefit from having a readily dispersible calcium supplement that remains homogeneously distributed in the composition. Dairy products and analogs such as milk, shakes, yogurt, cheese and sour cream can be homogeneously supplemented with more calcium than they currently deliver. Drinks and dry mixes for making drinks can now be supplemented with bioavailable calcium that does not sediment or taste gritty or chalky. Processed meats, confections, and bakery items that typically use a protein source from soy, egg, milk or grains can now obtain the same functional attributes using a high calcium protein from the same source. The opacity feature of this invention might be used by these skilled in the art of providing visual appeal to low fat foods or for making a coffee whitener which delivers enough calcium to a cup of coffee to be equivalent to drinking eight ounces of milk.

While the above provides a full and complete disclosure of the preferred embodiments of the invention, various modifications, alternate constructions and equivalents may be employed, as desired. Therefore, the above description and examples should not be construed as limiting the scope of the invention, which is defined by the appended claims.

What is claimed is:

1. A process for improving the aqueous suspension characteristics of an insoluble calcium salt comprising the steps of:

mixing a protein source with water;
adding a generally insoluble calcium salt to said mixture wherein the proteinsolution or supension is heated to a temperature in the range of about 110°–195° F.; and
drying the mixture.

2. A process according to claim 1 wherein the generally insoluble calcium salt is selected from at least one of calcium carbonate, calcium phosphate, and calcium citrate.

3. A process according to claim 2 wherein the generally insoluble calcium salt is calcium carbonate.

4. A process according to claim 2 wherein the generally insoluble calcium salt is tricalcium phosphate.

5. A process according to claim 1 wherein the protein source is soluble or partially soluble or prepared from an insoluble protein by adjusting the pH above or below the isoelectric pH.

6. A process according to claim 5 wherein the protein source is an acid casein, a milk protein coprecipitate, or an acid soy protein concentrate or isolate.

7. A process according to claim 5 wherein the protein source is selected from milk, milk protein concentrate, sodium caseinate, calcium case mate, milk protein isolate, and soy protein concentrate or isolate.

8. A process according to claim 1 wherein the calcium-salt containing mixture is pasteurized by heating to about 160 F. for about 30 minutes.

9. A product produced according to the process of claim 1.

10. A process for obtaining a dry powder from an aqueous composition that can be reconstituted in water to produce a stable suspension of an insoluble calcium salt, comprising the steps of:

mixing a protein source with water;
mixing a generally insoluble calcium salt with said mixture wherein the protein solution or suspension is heated to a temperature in the range of about 110°–195° F.; and
drying the mixture, the resulting dried mixture being adapted for reconstitution in water with an enhanced time of suspension of said insoluble calcium salt without producing visible sediment.

11. A process according to claim 10 wherein the generally insoluble calcium salt is selected from at least one of: calcium carbonate, calcium phosphate, and calcium citrate.

12. A process according to claim 11 wherein the generally insoluble calcium salt is calcium carbonate.

13. A process according to claim 11 wherein the generally insoluble calcium salt is tricalcium phosphate.

14. A process according to claim 10 wherein the protein source is soluble, partially soluble, or prepared from an insoluble protein by adjusting the pH above or below the isoelectric pH.

15. A process according to claim 14 wherein the protein source is selected from at least one of: acid casein, milk protein coprecipitate, and acid soy protein concentrate or isolate.

16. A process according to claim 14 wherein the protein source is selected from one or more of: milk, milk protein concentrate, sodium caseinate, calcium caseinate, milk protein isolate, and soy protein concentrate or isolate.

17. A product produced according to the process of claim 10.

18. A process for increasing the aqueous suspension characteristics of an insoluble calcium salt, comprising the steps of:
- mixing at least a partially soluble protein source with water;
- adding a generally insoluble calcium salt selected from at least one of calcium carbonate, calcium phosphate, and calcium citrate to said mixture;
- heating the resulting mixture to a temperature in the range of about 110° to 195° F.; and
- drying said mixture at a temperature greater than 195° F.

19. A process for obtaining a dry powder from an aqueous composition, that can be reconstituted in water to produce a stable suspension of insoluble calcium salts, comprising the steps of:
- mixing about 40 pounds of an acid casein with about 180 pounds of water at a temperature in the range of 110 F.;
- adjusting the pH of said mixture to about 7.0 by adding about 200 grams of sodium hydroxide and 218 grams of lime;
- agitating said mixture for about 30 minutes;
- blending 1440 grams of calcium carbonate with said agitated mixture while maintaining the temperature at 110 F. for about 30 minutes;
- heating said calcium-containing agitated mixture to a temperature in the range of 160 F. for about 30 minutes; and
- drying the resulting heated mixture.

20. A product produced according to the process of claim 19.

* * * * *